United States Patent [19]

Akiyama

[11] Patent Number: 5,414,532
[45] Date of Patent: May 9, 1995

[54] METHOD OF PRESCRIBING PROCESSING CONDITIONS FOR CASSETTE STORED IMAGES AND APPARATUS FOR READING IMAGES PROCESSED ACCORDING TO THOSE CONDITIONS

[75] Inventor: Kazuya Akiyama, Kyoto, Japan

[73] Assignee: Dainippon Screen Mfg. Co., Ltd., Kyoto, Japan

[21] Appl. No.: 226,652

[22] Filed: Apr. 12, 1994

[30] Foreign Application Priority Data

Apr. 15, 1993 [JP] Japan .................................. 5-088715

[51] Int. Cl.6 .............................................. H04N 1/10
[52] U.S. Cl. ........................... 358/468; 358/474; 358/498; 355/308; 271/9; 271/145
[58] Field of Search ............... 358/448, 468, 474, 488, 358/494, 496, 497, 498, 308; 271/9, 145, 162, 164

[56] References Cited
U.S. PATENT DOCUMENTS

| | | | |
|---|---|---|---|
| 4,930,016 | 5/1990 | Yazawa et al. | 358/296 |
| 5,050,007 | 9/1991 | Akanabe et al. | |
| 5,067,835 | 11/1991 | Yamamoto et al. | 271/145 |
| 5,073,829 | 12/1991 | Katsuta et al. | 358/498 |
| 5,327,259 | 7/1994 | Furusawa | 358/448 |

Primary Examiner—Scott A. Rogers
Attorney, Agent, or Firm—Ostrolenk, Faber, Gerb & Soffen

[57] ABSTRACT

An image reading device applies a series of image reading processing steps to an original cassette. Each original cassette can accommodate a plurality of originals, and has its own cassette identification signal. A plurality of the original cassettes are inserted into an automatic original feeding device, and they are delivered in succession to or from the image reading device. A cassette code identification unit detects the cassette identification signal of the original cassette to be supplied. Original data corresponding to an original identification signal, the cassette identification signal, and image processing conditions that correspond to each original are stored into an original data storage unit. An original code identification unit searches and extracts the original data relating to each original in the original cassette identified by the cassette identification signal. An image reading unit reads the image-bearing original according to the extracted original data.

24 Claims, 9 Drawing Sheets cassette code #5         55a ~ c : original

FIG. 6

| address | item | data example | |
|---|---|---|---|
| 1 | original code | A-1 | D1 |
| 2 | cassette code | #5 | D2 |
| 3 | magnification | 100% | |
| 4 | rotation angle | 20° | |
| 5 | scan start X1 | 20mm | |
| 6 | scan start Y1 | 20mm | D3 |
| 7 | scan end X2 | 70mm | |
| 8 | scan end Y2 | 70mm | |
| 9 | processing condition code | 3 | |
| 10 | original code | A-2 | |
| 11 | cassette code | #5 | |
| 12 | magnification | 80% | |
| . | . | . | |
| . | . | . | |

FIG. 7

| address | item | data example |
|---|---|---|
| 9 | highlight density (R) | 0.2 |
| 10 | highlight density (G) | 0.2 |
| 11 | highlight density (B) | 0.2 |
| 12 | shadow density (R) | 2.3 |
| 13 | shadow density (G) | 2.3 |
| 14 | shadow density (B) | 2.3 |

METHOD OF PRESCRIBING PROCESSING CONDITIONS FOR CASSETTE STORED IMAGES AND APPARATUS FOR READING IMAGES PROCESSED ACCORDING TO THOSE CONDITIONS

BACKGROUND OF THE INVENTION

1. Field of the Invention

The present invention relates to an image reading device capable of reading an image-bearing original in accordance with image processing conditions prescribed for each original, and also relates to a method for prescribing image processing conditions such that a plurality of originals from an original cassette are identified and read into image signals individually.

2. Description of the Related Art

According to an image reading device of recent use in the prepress printing industry, an original, such as a color document, is read into image signals with a photoelectric element; then the image signals are processed in a predetermined way. More specifically, the image reading device reads the original with a flatbed-scanning type scanner or a drum-scanning type scanner. With the drum-scanning type scanner, the original is pasted on a scanner drum. After that, the drum is rotated and the original is read into the image signals. With the flatbed-scanning type scanner, the original is inserted into a flatbed-type cassette. After that, the flatbed-type cassette and a photographic element such as CCD (Charge Coupled Device) are displaced relatively and the original is read into the image signals.

To improve efficiency, a recent flatbed-scanning type scanner employs a stacker wherein a plurality of original cassettes are loaded, and they are delivered successively by an automatic cassette feeding device. Thus, the original cassettes accommodating an original are delivered to the image reading device one after the other. Subsequently, the image reading device processes the original according to prescribed image processing conditions.

For example, according to an image reading device in U.S. Pat. No. 5,050,007, image processing conditions relating to an original are stored in an internal storage. When an original cassette is delivered to a reading unit, the operator identifies the original at the original cassette, then selects and designates the image processing conditions relating to the identified original. The original is read according to the image processing conditions.

With an image reading device as in U.S. Pat. No. 5,073,829, one original is inserted into each original cassette; and each original cassette has an identification code. Prior to a regular scanning, every original goes through a tentative scanning (pre-scanning) and image processing conditions obtained by the pre-scanning is stored with an identification code of the original (or the identification code of the original cassette). Subsequently, when the original cassette is delivered to an image reading unit of the image reading device by an automatic cassette feeding device, an original identification code reading unit reads the identification code of the original cassette. Thus, the delivered original cassette is recognized by the identification code, whereby the original in the original cassette is identified. Subsequently, the image reading device detects the image processing conditions which correspond to the identification code of the original and reads the original according to the detected image processing condition.

Further improvement in efficiency and automation are demanded for the image reading device with the automatic original feeding device. Specifically, it would be more economical and efficient if more than two originals could be inserted into each original cassette so that a stacker could accommodate a larger number of papers. Further, a rapid feed/discharge of the original cassette would be desirable.

To insert a plurality of originals into one original cassette, the originals must be identified individually and image processing conditions must be set for each original, since processing of the original rather than processing of the original cassette has been generally controlled in the prepress processing industry.

The conventional image reading device, however, operates on the assumption that each original cassette accommodates only one original; and the image processing conditions which relate to each original are detected in accordance with the identification code of the original cassette. Therefore, if a plurality of originals were inserted into one original cassette, the conventional image reading device would fail to identify the originals individually, and set the image processing conditions for each original.

SUMMARY OF THE INVENTION

Accordingly, it is a primary object of the present invention to provide an image reading device capable of processing an original according to prescribed image processing conditions even when a plurality of originals are inserted into an original cassette.

In order to fulfill the above object, a reading device in the present invention comprises a cassette code identification unit for identifying an original cassette which accommodates a plurality of originals and has its own cassette identification signal generated by reading a cassette identification code associated with the original cassette, an original data storage unit for storing therein original data corresponding to an original identification signal which is assigned to each original, the cassette identification signal of the cassette which accommodates each original identified by an original identification signal, and image processing conditions relating to each original identified by an original identification signal, an original data searching unit for searching and extracting the original data relating to each original in the original cassette from the original data storage unit according to the cassette identification signal identified by the cassette code identification unit, and an image reading unit for image reading each original according to the image processing conditions which correspond to the original data extracted by the original data searching unit.

In this construction, each original cassette can accommodate a plurality of originals, and each original can be processed according to a prescribed image processing condition. As a result, a larger number of originals can be processed even with a smaller number of original cassettes. Therefore, image reading efficiency will be improved.

It is another object of the present invention to provide a method which enables processing of an original according to prescribed image processing conditions even when an original cassette accommodates a plurality of originals.

The above object may be fulfilled by an image reading condition setting method for storing original data in an original data storage unit, the original data corresponding to an original identification signal which is assigned to each original, a cassette identification signal which is assigned to an original cassette accommodating each original identified by an original identification signal, and image processing conditions relating to each original identified by an original identification signal; selecting the image processing conditions relating to each original in the original cassette; and reading each original according to the selected image processing conditions.

In the image reading condition setting method, the cassette identification signal which is assigned to the original cassette is identified. Then, the original storage data unit is examined so that each original in the original cassette is identified. Finally the image processing conditions relating to each identified original are selected from the original data storage unit.

In this construction, each original cassette can accommodate a plurality of originals, and each original can be read according to the image processing conditions relating to each original. As a result, a larger number of originals can be processed even with a smaller number of original cassettes. Therefore, image reading efficiency will be improved.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows an example of data which are stored in an original data storage unit in the image reading device in FIG. 2;

FIG. 7 shows a modification of the original data in FIG. 6;

DESCRIPTION OF THE PREFERRED EMBODIMENT

An embodiment of the present invention will now be described in detail with reference to the drawings.

Figure 1:
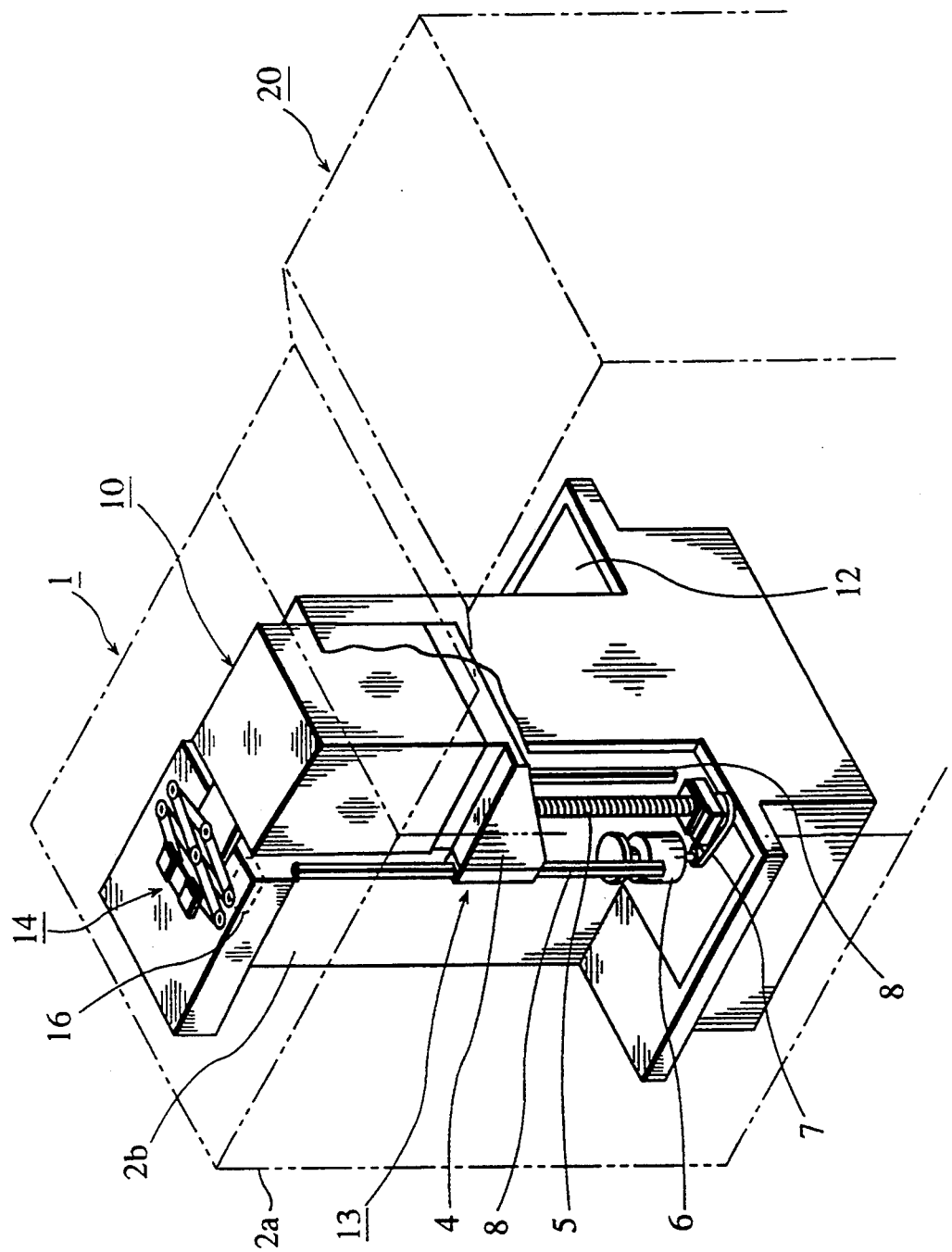
FIG. 1 is a perspective view of an automatic original feeding device in an image reading device in an embodiment of the present invention.
Figure 3:
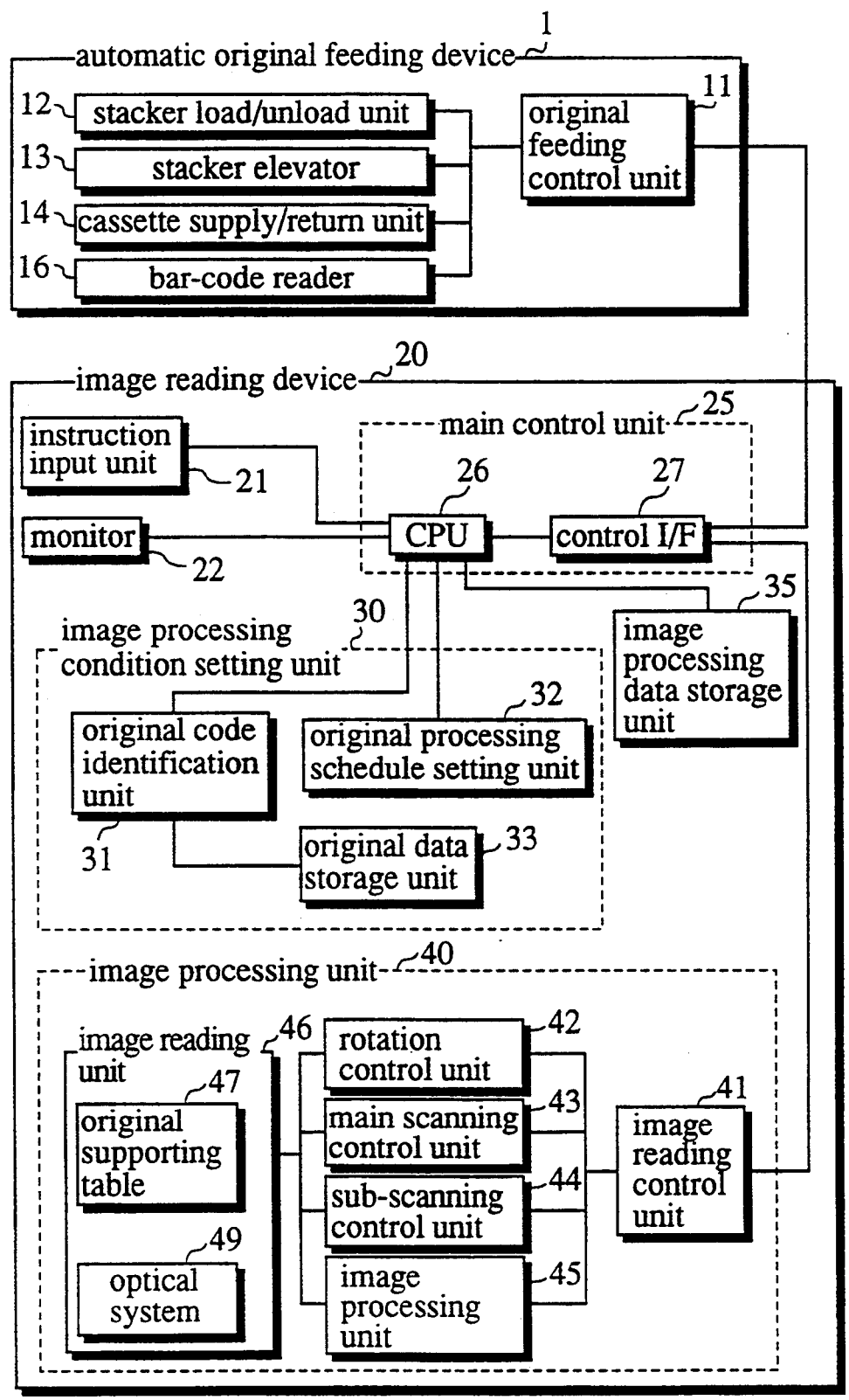
FIG. 3 is a block diagram depicting construction of the image reading device including the automatic original feeding device.

An automatic original feeding device 1 in FIGS. 1 and 3 comprises an external plate unit 2a, a main unit 2b, a stacker 10 which accommodates a plurality of original cassettes, a stacker load/unload unit 12 for loading or unloading the automatic original feeding device with the stacker 10, a stacker elevator 13 for moving up and down said cassette holding stacker 10, a cassette supply/return unit 14 for supplying/returning the original cassette to/from an image reading unit 20, a bar-code reader (a cassette code identification unit) 16 for reading a bar-code which is attached to the original cassette, and an original feeding control unit 11 (FIG. 3) for controlling each of the above units.

The stacker elevator 13 comprises a stacker supporting table 4 on which the stacker 10 is placed, a lead screw 5 comprised of a ball screw which rotates to move the stacker supporting table 4 up and down, a pulse motor 6 for rotating the lead screw 5, a belt 7 which connects the lead screw 5 with the pulse motor 6, and a linear shaft 8 for smoothly guiding the up and down movement of the stacker supporting table 4.

The cassette supply/return unit 14 has a change arm of a pantagraph structure where a plurality of links are pin connected. Driven by a pulse motor (not illustrated), the change arm stretches toward or from the original cassette at the stacker. The change arm has a connecting piece at its end. When the change arm is extended, the connection piece operates to supply the original cassette to an image reading unit 46. When the change arm returns to its original position, the connection piece returns the original cassette from the image reading unit 46 to the stacker 10.

Figure 4:
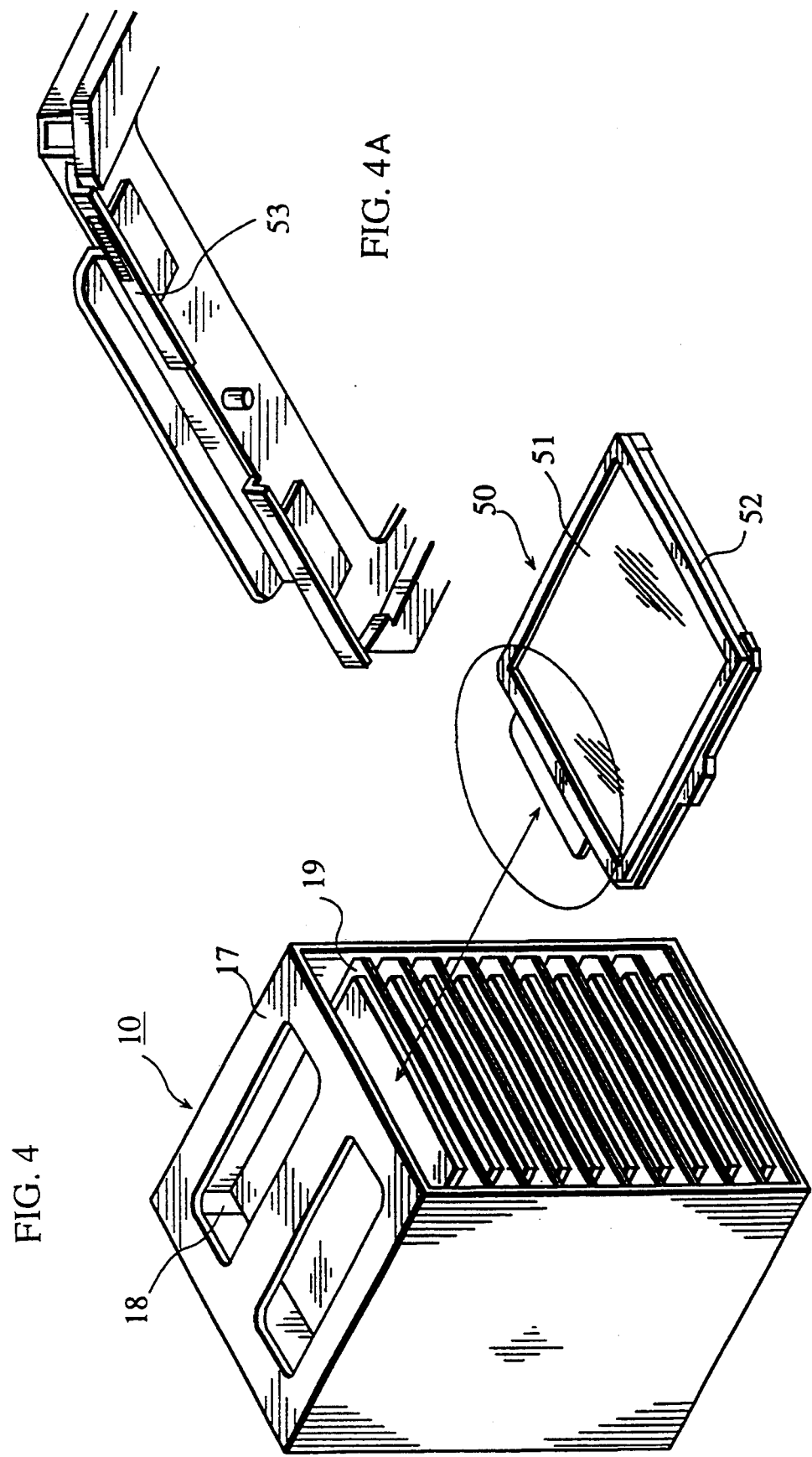
FIG. 4 is a perspective view of a stacker and an original cassette.

The stacker in FIG. 4 is a box frame 17 where front and rear sides are left opened and a plurality of cassette shelves 19 are formed inside. An original cassette 50 is placed on the cassette shelf 19. A cassette stopper 18 is formed at the rear side of the box frame 17 so that the original cassette 50 will not move rearward beyond the cassette stopper 18. According to the illustrated example, the stacker 10 accommodates ten shelves so that the stacker 10 can accommodate ten original cassettes.

A top and bottom surface of the original cassette 50 are a pair of transparent glass plates 51 for sandwiching the original therebetween; and the original cassette 50 is surround with a frame 52 formed of a resin or the like. A bar-code 53 is taped on a back surface of the original cassette 50, specifically at the point corresponding to the bar-code reader 16 mounted on the automatic original feeding device 1. Accordingly, the bar-code reader 16 reads the bar-code 53 on the original cassette without difficulty as stacker 10 moves up and down. The bar-code reader 16 may be constructed at the automatic original feeding device 1, or at the image reading device. Corresponding to the placement of the bar-code reader 16, the bar-code 53 will be taped on the original cassette.

Figure 2:
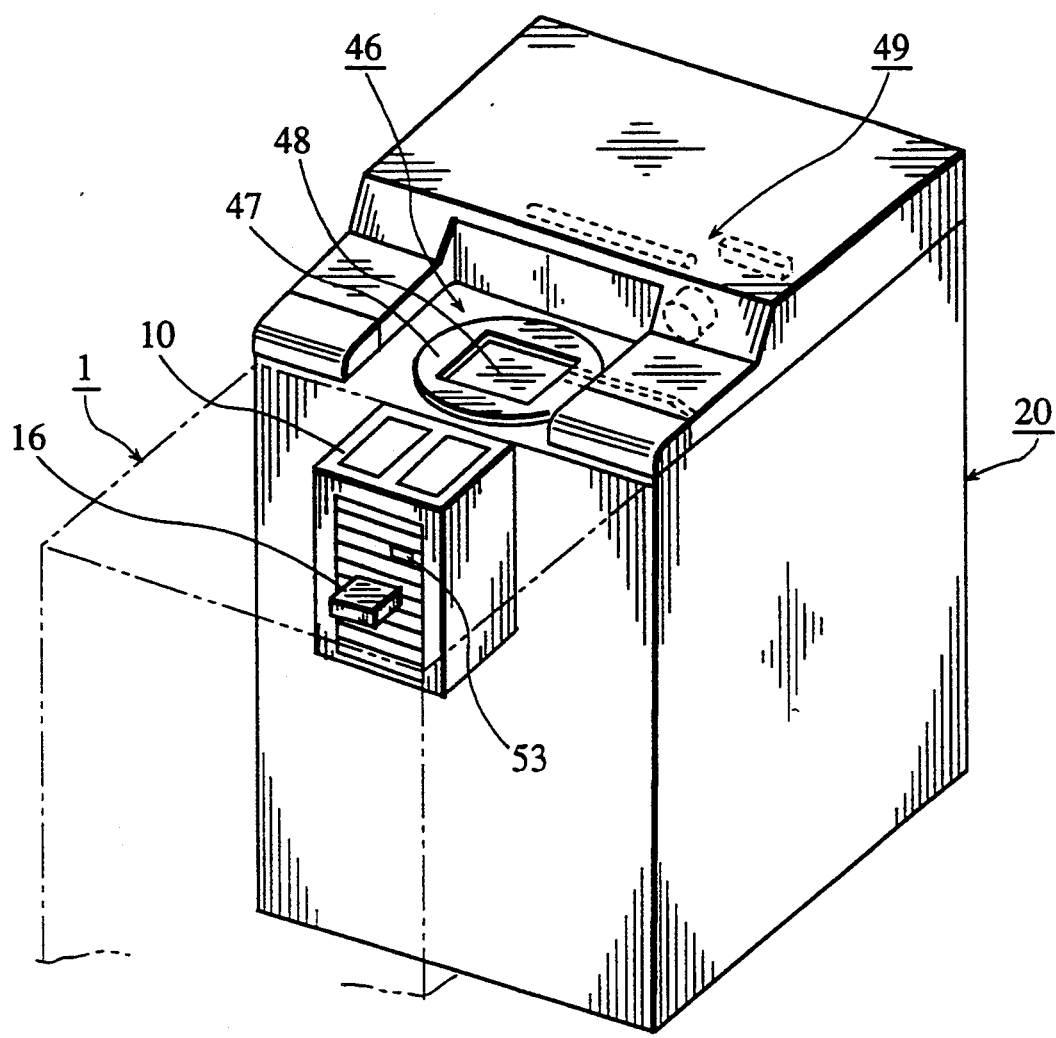
FIG. 2 is a perspective view of the above image reading device.

With reference to FIGS. 2 and 3 it is seen that image reading device 20 comprises an instruction input unit 21 for inputting various instructions, a monitor 22 for displaying image processing conditions, an image processing condition setting unit 30 for setting the image processing conditions for each original, an image reading processing unit 40 for processing an image-bearing original, an image processing data storage unit 35 where image data processed by the image reading processing unit 40 are stored, and a main control unit 25 for controlling each of the above units.

The image processing unit 40 comprises an image reading unit 46 which is comprised of an original supporting table 47 where the original cassette is placed at a predetermined location, an optical system 49 for reading the image-bearing original optically, a rotation control unit 42 for controlling rotation of the original supporting table 47 according to placement of the original in the original cassette 50, a main scanning control unit 43 for controlling to read image signals from an effective range area which is formed along with a main scanning direction, a sub scanning control unit 44 for controlling the placement of the original supporting table 47 along with a sub-scanning direction, an image processing unit 45 for processing the image data from the image reading unit 46 according to prescribed image processing conditions, and an image reading control unit 41 for controlling each of the above unit.

The original supporting table 47 comprises a rotation table on which the original cassette 50 is placed and a drive unit for rotating the original cassette on the rotation table 47 according to rotation angle data assigned to each original. Also the original supporting table 47 can be displaced along with the sub scanning direction. A light transmission unit 48 is mounted at a center of the rotation table for transmitting light from a light source (not shown). The optical system 49 comprises the light source for the light with which the original is irradiated, a mirror or a lens for converting the light which has transmitted through the original and guiding it to a CCD (Charge Coupled Device), and the CCD for converting the optical image into electric signals.

The image processing condition setting unit 30 comprises an original data storage unit 33 where the image processing conditions which are obtained from the tentative scanning of the original are stored, an original code identification unit 31 for identifying an identification code (original code) of the original at the original cassette 50 as referring to an identification code (cassette code) of the cassette, and an original processing schedule setting unit 32 for setting a processing order for a plurality of the originals.

FIGS. 6 and 7 show original data stored in the original data storage unit 33. The original data in FIG. 6 are generated for each original code. In the figure, the original data comprise original code data D1, cassette code data D2, and image processing condition data D3. For example, "3" at the row of address 9 represents an address in the original data storage unit 33 where the image processing conditions such as a highlight density, a shadow density, and a sharpness are stored. The original data in FIG. 7, on the other hand, directly represent the image processing conditions instead of its address in the original data storage unit 33.

The main control unit 25 comprises a CPU 26 for controlling each of the above units and operating a computation, and a control I/F 27.

Figure 5:
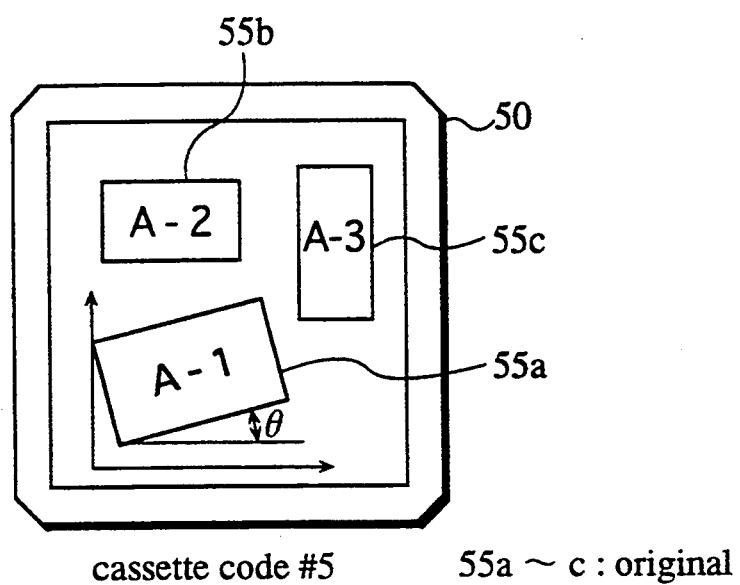
FIG. 5 is a rear plan view of the original cassette which accommodates a plurality of originals.
Figure 8:
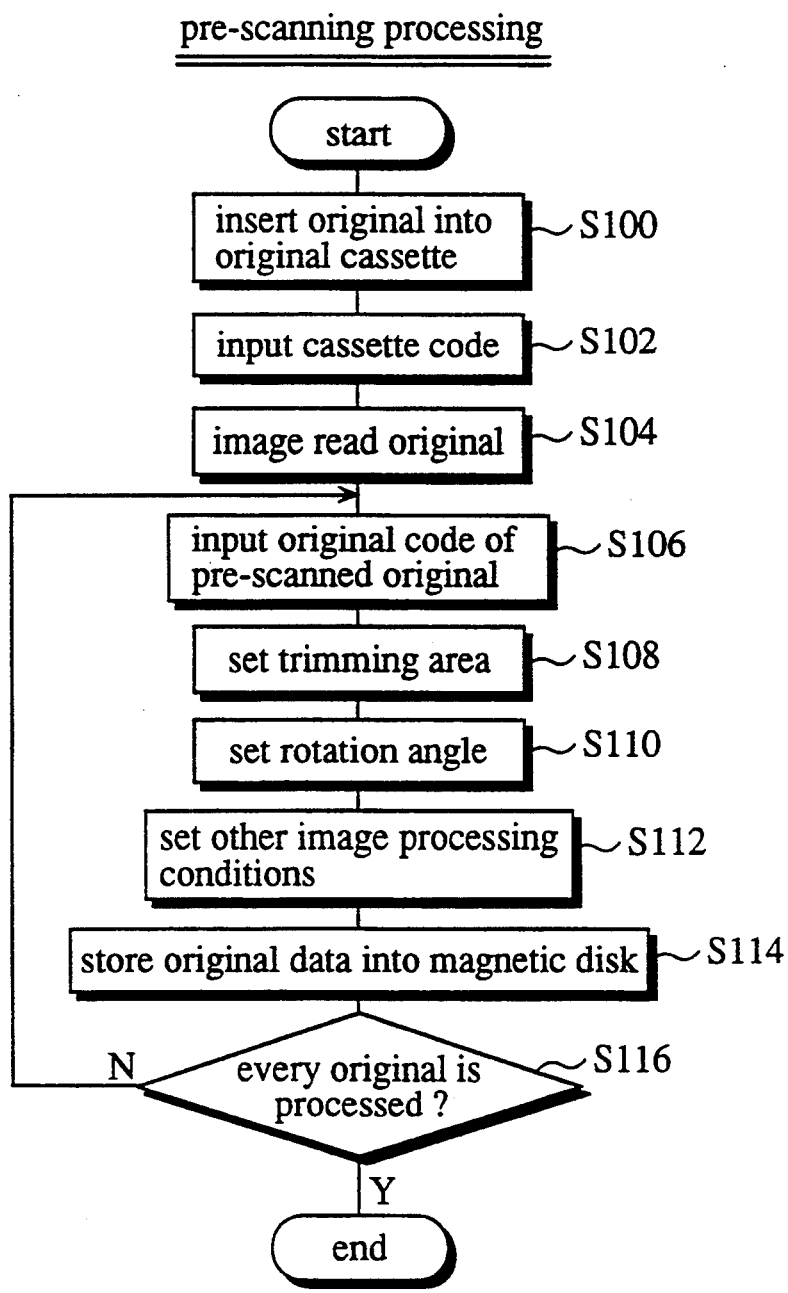
FIG. 8 is a flow chart depicting a tentative scanning (pre-scanning) whereby image processing conditions are obtained.

Operation of the image reading device 20 will be described now. Prior to the regular image reading processing with the image reading device 20, every original goes through pre-scanning. More specifically, the original is read with the image processing condition setting device 40 hereunder referred to as a setting device) so that the image processing conditions are set for the original. Subsequently, according to the image processing conditions, the image reading device 20 processes the originals successively. The pre-scanning will be described in detail by referring to the flow chart of FIG. 8. It is assumed hereunder that the original cassette 50 (cassette code #5) accommodate three originals 55a–55c (original code: A-1, A-2, A-3). The original cassette 50 holding the three originals in a common plane is shown in FIG. 5.

Pre-scanning Processing

At step S100, the operator inserts the originals into the original cassette 50; here they are the originals A-1 through A-3.

At step S102, the operator sets the original cassette 50 to the setting device 30, and inputs the cassette code (#5).

At step S104, every original A-1 through A-3 at the original cassette 50 is read, and displayed on the monitor 22. Then, the operator sets the image processing conditions for each original, which will be described in detail hereunder.

At step S106, the operator inputs the original code (A-1) of the first original.

At step S108, the operator sets an area to be trimmed [(X1=20, Y1=20)−(X2=70, Y2=70)] within the original A-1.

At step 110, the operator sets a rotation angle $\theta$ (=20° in FIG. 5) of the original A-1.

At step S112, the operator sets other image processing conditions [magnification (=100%), highlight density, shadow density etc.,].

At step S114, the image processing conditions set at the above steps are stored into a magnetic disk (not shown of storage unit 33).

At step S116, whether the image processing conditions have been set for every original is judged. If judged negatively, the operation returns to step S106 and steps S106–S116 are repeated on the originals A-1, A-2, and A-3.

From the above pre-scanning processing, the original data in FIG. 6 or FIG. 7 are stored in the magnetic disk of unit 33.

Successive Image Reading Processing

Figure 9:
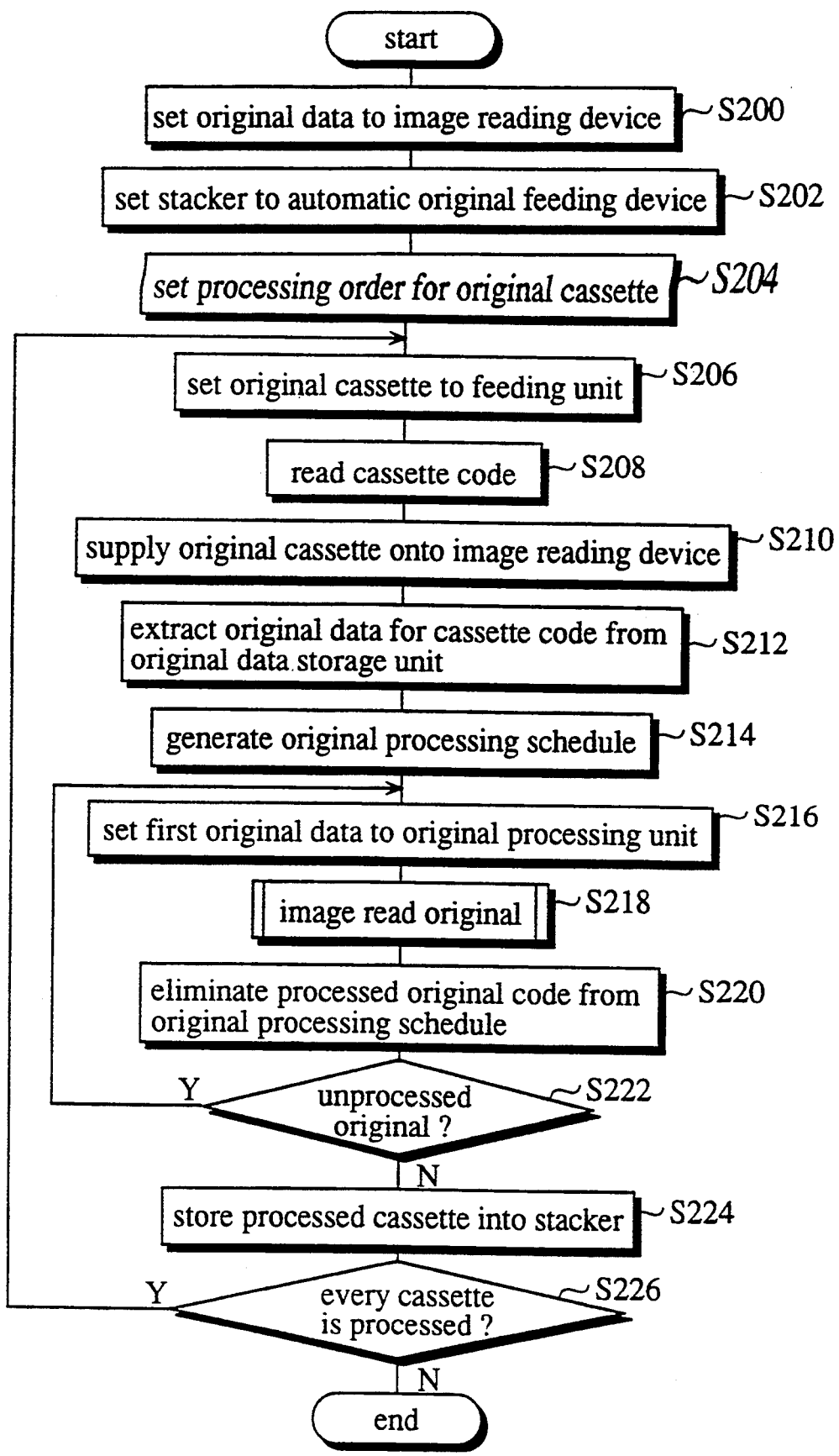
FIG. 9 is a flow chart depicting image reading operation with the image reading device in FIG. 2.

The image reading processing will be described as referring to FIG. 9.

At step S200, the magnetic disk of unit 33 holding the original data obtained from the pre-scanning processing is inserted into the image reading device 20, so that the original data are stored in the original data storage unit 33 which is part of the image reading device 20.

At step S202, the operator sets the stacker 10 which accommodates the original cassettes which have been through the pre-scanning processing to the automatic original feeding device 1. The image processing conditions have been set for the originals in the original cassettes 50 at the automatic original feeding device 1.

At step S204, a processing order is determined among the original cassettes 50 at the stacker 10, and the processing order is stored in the original processing schedule setting unit 32. The operator may input the processing order by the original code or the cassette code from the instruction input device 21. Otherwise, the originals may be processed upward from the original cassette at the bottom of the stacker 10, or downward from the original cassette at the top of the stacker 10.

At step S206, according to the processing order, the stacker 10 is moved up or down so that the original cassette 50 to be processed next is delivered to a feeding position at the automatic original feeding device 1.

At step S208, the bar-code reader 16 reads the bar-code 53 taped on the back side of the original cassette 50 whereby the cassette code is identified.

At step S210, the cassette supply/return unit 14 supplies the original cassette 50 onto the original supporting table 47 which is located at the image reading device 20.

At step S212, the original code identification unit 31 searches the original data storage unit 33 for the original data corresponding to the cassette code identified by the bar-code reader 16. For example, from the original data in FIG. 6 the cassette code data D2 are searched to detect the identified cassette code. When the cassette code is detected, the original code data D1 and the image processing condition data D3 which correspond to the cassette code are extracted. When the original cassette 50 accommodates more than two originals, the same number of the original data as the originals are extracted.

At step S214, the original processing schedule setting unit 32 sets the processing order (original processing schedule) for the originals to which the extracted original data are assigned. The processing order may be determined beforehand; otherwise, the operator inputs the processing order at this step S214.

At step S216, the original data for the original to be processed first are supplied to the image processing unit 45.

Figure 10:
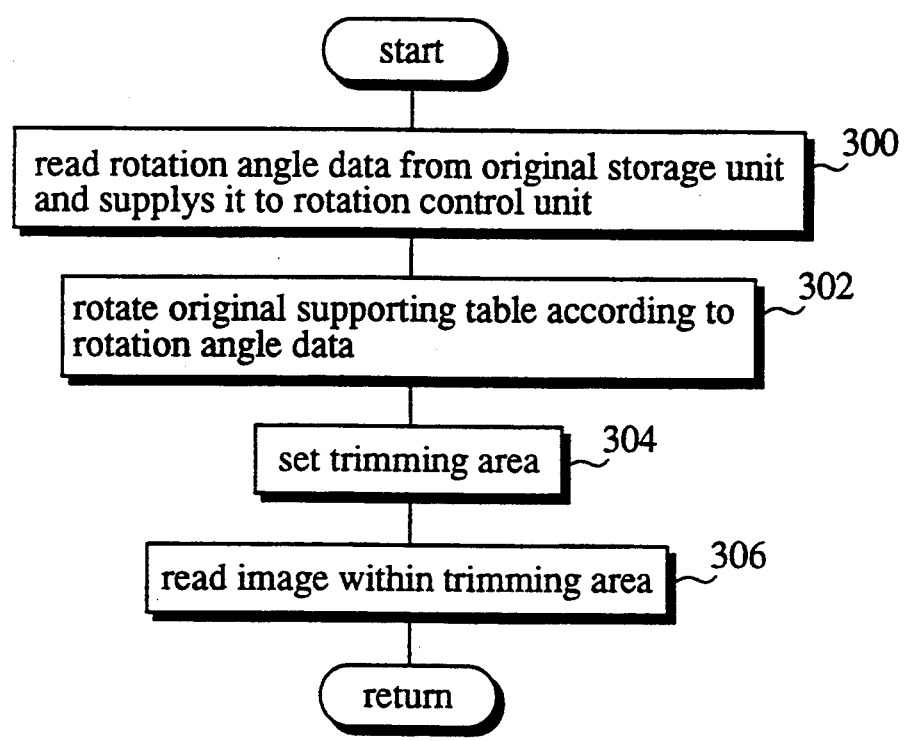
FIG. 10 is a flow chart depicting a main scanning of an original which is a part of the image reading operation in FIG. 9.

At step S218, the first original is read. The regular image reading processing will be described in detail with reference to FIG. 10.

At step S300, out of the image processing conditions (original data) in the original storage unit 33, which correspond to the original code (A-1), the rotation angle data are read. Then, they are supplied to the rotation control unit 42.

At step S302, the original supporting table 47 is rotated according to the rotation angle data.

At step S304, a trimming area is set according to the trimming area data among the image processing conditions.

At step S306, the original is scanned. Image data within the trimming area are processed according to the image processing conditions, so that image processing data corresponding to the original (A-1) will be generated. Subsequently, the operation returns to Step S220.

At step S220, the original processing schedule setting unit 32 eliminates from the original processing schedule the original code representing the original which has been already processed. Accordingly, the original code of the original which was originally arranged at the second place will be brought up to the first.

At step S222, the original processing schedule is reviewed, and it is judged if there is any unprocessed original. If judged positively, the operation will return to Step S216, and steps S218 and S220 are repeated as on the original at the next place in the original processing schedule. When it is confirmed that every original has been processed, the operation will move to step S224.

At step S224, the cassette supply/return unit 14 returns the processed original cassette from the image reading unit 46 onto the shelf in the stacker 10 where the original cassette was original placed. Thus, the image reading processing of one original cassette is completed.

At step S226, if every original cassette has been processed is judged. If there is an unprocessed original cassette, the operation returns to step S206, and repeats the above operation on the next original cassette. When it is confirmed that every original cassette has been processed, the operation will be ended.

Although in the above embodiment the image processing conditions are stored in the magnetic disk so that the image reading device 20 can read the original according to the image processing conditions, the setting device 20 may be on-line connected with the image reading device 20 to supply the image processing conditions to the image reading device. Also at the pre-scanning operation, the image processing conditions are set by the setting device, they may be set by the image reading device 20.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading device for optically reading a plurality of originals which are inserted into an original cassette to which a cassette code is assigned and converting the originals into image signals, the image reading device comprising:
   the original cassette including a plurality of originals arranged in a common plane;
   a cassette code identification means for identifying the cassette code which is assigned to the original cassette;
   an original data storage means for holding original data which includes an original code assigned to each original, the cassette code assigned to the original cassette accommodating the originals, and an image processing condition corresponding to each original;
   an original data searching means for searching through the original data storage means for the original data corresponding to each original in the original cassette in accordance with the cassette code identified by the cassette code identification means, and extracting the original data; and
   an image reading means for image reading each original according to an image reading condition which is in the original data extracted by the original data searching means.

2. The image reading device of claim 1 further comprising an original cassette transport means for supplying the original cassette to the image reading means and taking the original cassette away from the image reading means, wherein the cassette code identification means identifies the cassette code assigned to the original cassette before the original cassette transport means supplies the original cassette to the image reading means.

3. The image reading device of claim 2, wherein the original cassette has a bar-code which represents the cassette code, and the cassette code identification means has a bar-code reader for reading the bar-code to identify the cassette code.

4. The image reading device of claim 3, wherein the original cassette transport means is comprised of:
   a cassette moving unit which holds a plurality of the original cassettes and moves a predetermined original cassette to a first position which enables it to be supplied and returned; and
   a cassette supply/return unit for supplying the predetermined original cassette from the first position to a second position which enables image reading of originals in the predetermined original cassette and returning the predetermined original cassette to the first position after the image reading is completed.

5. The image reading device of claim 4, wherein the bar-code reader is disposed to identify the cassette code which is attached to the predetermined original cassette when the predetermined original cassette is at the cassette moving means.

6. The image reading device of claim 4, wherein the cassette moving unit is comprised of a cassette storage unit where a plurality of the original cassettes are stacked vertically, and a lifting unit for raising and lowering the cassette storage unit; and the cassette supply/return unit has a stretching member including a pantagraph structure for horizontally displacing the predetermined original cassette between the first position and the second position.

7. The image reading device of claim 3 further comprising an original processing order setting means for setting a processing order for the originals which correspond to the original data extracted by the original data searching means, wherein the original reading means image reads the originals according to the processing order set by the original processing order setting means.

8. The image reading device of claim 7 further comprising an input means with which an operator inputs an instruction, wherein the original processing order setting means sets the processing order according to the instruction inputted by the operator.

9. The image reading device of claim 7, wherein the original processing order setting means includes processing order data which are generated beforehand, and sets the original processing order according to the original processing order data.

10. The image reading device of claim 7 further comprising an original cassette supply order setting means for setting a supply order for the original cassettes, wherein the original cassette transport means holds a plurality of the original cassettes and supplies the original cassettes to the image reading means according to the supply order set by the original cassette supply order setting means.

11. The image reading device of claim 10 further comprising an input means with which an operator inputs an instruction, wherein the original cassette supply order setting means sets the supply order according to the instruction inputted by the operator.

12. The image reading device of claim 10, wherein the original cassette supply order setting means comprises a supply order data holding unit for holding supply order data which are generated beforehand, and setting a supply order by which the original cassette is supplied according to the supply order data.

13. The image reading device of claim 10, wherein the original cassette transport means is comprised of:

a cassette moving unit which holds a plurality of the original cassettes and moves a predetermined original cassette to a first position which enables the predetermined original cassette to be supplied and retrieved; and a cassette supply/return unit for supplying the predetermined original cassette from the first position to a second position at which image reading of originals in the predetermined original cassette is enabled, and returning the predetermined original cassette to the first position after the image reading is completed.

14. The image reading device of claim 13, wherein the bar-code reader is placed to identify the cassette code which is attached to the predetermined original cassette when the predetermined original cassette is operatively positioned by the cassette moving unit.

15. The image reading device of claim 14, wherein the cassette moving unit is comprised of a cassette storage unit where a plurality of the original cassettes are stacked vertically, and a lifting unit for moving the cassette storage unit up and down; and the cassette supply/return unit includes a pantagraph structure that constitutes a stretching member for horizontally displacing the predetermined original cassette between the first position and the second position.

16. The image reading device of claim 1 further comprising a scanning area control means for controlling image reading of each original based on scanning area data relating to each original.

17. The image reading device of claim 16 further comprising an original processing order setting means for setting a processing order for the originals which correspond to the original data extracted by the original data searching means, wherein the image reading means reads the originals according to the processing order set by the original processing order setting means.

18. The image reading device of claim 1 further comprising an original processing order setting means for setting a processing order for the originals which correspond to the original data extracted by the original data searching means, wherein the image reading means reads the originals according to the processing order set by the original processing order setting means.

19. An image reading condition setting method for storing original data in an original data storage means, the original data including an original code assigned to each original, a cassette code assigned to an original cassette accommodating a plurality of originals, and an image processing condition corresponding to each original; with an image processing condition being selected in relation to each of the plurality of the originals in the original cassette from the original data storage means, and with each original being image read according to the selected image processing condition; the image reading condition setting method comprising steps of:

arranging a plurality of originals in the original cassette in a common plane;

identifying the cassette code which is assigned to the original cassette;

searching through the original data storage means according to the cassette code so that a plurality of the originals which are inserted into the original cassette are identified; and selecting from the original data storage means the image processing condition relating to each identified original by referring to its original code.

20. The image reading condition setting method as set forth in claim 19, further comprising a step of setting a processing order for a plurality of the identified originals.

21. The image reading condition setting method of claim 20 further comprises the steps of:

recognizing scanning area data which corresponds to the identified original from the image processing condition; and controlling reading according to the recognized scanning area data.

22. The image reading condition setting method of claim 19 further comprises the steps of:
   recognizing scanning area data which corresponds to the identified original from the image processing condition; and
   controlling reading according to the recognized scanning area data.

23. A method for image reading a plurality of originals which are arranged in an original cassette in a common plane, the method comprising steps of:
   inserting the originals into an original cassette to which a cassette code is assigned;
   generating original data including an original code assigned to each original, the cassette code assigned to the cassette accommodating the plurality of originals, and an image processing condition relating to each original;
   identifying the cassette code assigned to the original cassette, and searching for the original data relating each original in the original cassette according to the identified cassette code, and extracting the original data; and
   image reading each original according to the image processing condition which is included in the extracted original data.

24. The image reading method of claim 23 further comprising the steps of:
   recognizing scanning area data corresponding to each original in the original cassette from the image processing condition; and
   controlling reading based on the recognized scanning area data.

* * * * *